US010054794B2

(12) United States Patent
Hino et al.

(10) Patent No.: US 10,054,794 B2
(45) Date of Patent: Aug. 21, 2018

(54) OPTICAL SCANNER, IMAGE DISPLAY DEVICE, HEAD-MOUNTED DISPLAY, AND HEADS-UP DISPLAY

(71) Applicant: SEIKO EPSON CORPORATION, Tokyo (JP)

(72) Inventors: Makiko Hino, Matsumoto (JP); Yasushi Mizoguchi, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/697,988

(22) Filed: Sep. 7, 2017

(65) Prior Publication Data

US 2018/0088336 A1  Mar. 29, 2018

(30) Foreign Application Priority Data

Sep. 29, 2016  (JP) ................. 2016-191963

(51) Int. Cl.
*G02B 26/08* (2006.01)
*G02B 27/01* (2006.01)
*G02B 26/10* (2006.01)

(52) U.S. Cl.
CPC ..... *G02B 27/0172* (2013.01); *G02B 26/0816* (2013.01); *G02B 26/105* (2013.01); *G02B 26/101* (2013.01); *G02B 27/0176* (2013.01)

(58) Field of Classification Search
CPC ............ G02B 26/0816; G02B 26/0833; G02B 26/0841; G02B 26/085; G02B 26/0858; G02B 26/101; G02B 26/105; G02B 27/0172; G02B 27/0176

USPC ......... 359/198.1–199.4, 200.6–200.8, 221.2, 359/223.1–226.2
See application file for complete search history.

(56) References Cited

U.S. PATENT DOCUMENTS

| 7,570,406 B2 * | 8/2009 | Mizoguchi ........... G02B 26/085 359/199.3 |
| 2005/0179972 A1 | 8/2005 | Nomura et al. |
| 2005/0179974 A1 | 8/2005 | Nomura et al. |
| 2008/0218823 A1 | 9/2008 | Mizoguchi |

(Continued)

FOREIGN PATENT DOCUMENTS

| JP | 2005-221749 A | 8/2005 |
| JP | 2005-227327 A | 8/2005 |
| JP | 2008-216920 A | 9/2008 |

(Continued)

*Primary Examiner* — Euncha Cherry
(74) *Attorney, Agent, or Firm* — Oliff PLC

(57) ABSTRACT

Provided is an optical scanner including a movable portion, a frame body portion, a first axis portion that connects the movable portion and the frame body portion and oscillatably supports the movable portion around a first oscillation axis, a support portion, and a second axis portion that connects the frame body portion and the support portion and oscillatably supports the frame body portion around a second oscillation axis, in which, when a distance between an end portion of the movable portion in a direction following the second oscillation axis and the frame body portion is defined as L1, and a distance between an end portion of the frame body portion in a direction following the first oscillation axis and the support portion is defined as L3, a relationship corresponding to 1<L1/L3<5 is satisfied.

15 Claims, 10 Drawing Sheets

(56) References Cited

U.S. PATENT DOCUMENTS

| | | | | |
|---|---|---|---|---|
| 2013/0321889 A1* | 12/2013 | Mizoguchi | ........... | G02B 26/101 |
| | | | | 359/199.3 |
| 2016/0154233 A1* | 6/2016 | Takimoto | ............. | G02B 26/085 |
| | | | | 359/221.2 |

FOREIGN PATENT DOCUMENTS

| JP | 2009-223115 A | 10/2009 |
|---|---|---|
| JP | 2012-145753 A | 8/2012 |

* cited by examiner

OPTICAL SCANNER, IMAGE DISPLAY DEVICE, HEAD-MOUNTED DISPLAY, AND HEADS-UP DISPLAY

BACKGROUND

1. Technical Field

The present invention relates to an optical scanner, an image display device, a head-mounted display, and a heads-up display.

2. Related Art

For example, an optical scanner that is used in a projector, a head-mounted display, or the like, and scans with light is known (for example, refer to JP-A-2008-216920 and JP-A-2012-145753).

For example, the optical scanner disclosed in JP-A-2008-216920 includes a frame form drive member, a pair of first axis members that support the drive member in a pivotable manner around an X axis, a movable plate that is provided on an inner side of the drive member and is provided with a light reflecting portion, a pair of second axis members that support the movable plate in a pivotable manner around a Y axis, which is orthogonal to the X axis, relative to the drive member, a permanent magnet provided in the drive member, and a coil provided so as to face the permanent magnet. Further, as a result of overlapping a first voltage and a second voltage having different frequencies (drive frequency) from one another and applying the voltages to the coil, the movable plate is caused to pivot around the Y axis at the frequency of the second voltage while causing the movable plate to pivot around the X axis at the frequency of the first voltage. As a result of this, it is possible to scan light reflected by the light reflecting portion of the movable plate in a two-dimensional manner.

In addition, the optical scanner disclosed in JP-A-2012-145753 includes a plate form mirror, a frame form frame disposed in the periphery of the mirror, and a pair of cantilever portions that couple the mirror and the frame. In JP-A-2012-145753, as a result of using two such optical scanners, light is scanned in a two-dimensional manner, one optical scanner is driven in resonance, and the other optical scanner is driven in non-resonance. In this instance, in the optical scanner driven in non-resonance, the mirror is maintained in a hermetic state by a holder and a cover. As a result of this, the air resistance of the mirror is increased, and it is possible to perform high-accuracy, low-frequency non-resonance driving.

However, in a case in which the technique disclosed in JP-A-2012-145753 is applied to the optical scanner disclosed in JP-A-2008-216920, in addition to the air resistance of the drive member, which causes non-resonance driving, being increased, the air resistance of the movable plate, which causes resonance driving, is also increased, and therefore, there is a problem in that this leads to an increase in the power consumption.

SUMMARY

An advantage of some aspects of the invention is to provide an optical scanner capable of reducing the power consumption while configuring an optical scanner having excellent optical characteristics, and to provide an image display device, a head-mounted display, and a heads-up display provided with the optical scanner.

The advantage can be achieved by the following invention.

According to an aspect of the invention, there is provided an optical scanner including a movable portion having a light reflecting portion that reflects light, a frame body portion, a first axis portion that connects the movable portion and the frame body portion and oscillatably supports the movable portion around a first oscillation axis, a support portion, and a second axis portion that connects the frame body portion and the support portion and oscillatably supports the frame body portion around a second oscillation axis, which intersects the first oscillation axis, in which, in a planar view from a thickness direction of the movable portion, when a distance between an end portion of the movable portion in a direction following the second oscillation axis and the frame body portion is defined as $L1$, and a distance between an end portion of the frame body portion in a direction following the first oscillation axis and the support portion is defined as $L3$, a relationship corresponding to $1<L1/L3<5$ is satisfied.

According to such an optical scanner, as a result of the relationship corresponding to $1<L1/L3$ being satisfied, it is possible to decrease the air resistance borne when the movable portion oscillates around the first oscillation axis, and to increase the air resistance borne when the frame body portion oscillates around the second oscillation axis. Therefore, it is possible to increase the Q value of oscillation (vibration) of the movable portion around the first oscillation axis, and to decrease the Q value of oscillation (vibration) of the frame body portion around the second oscillation axis. Further, as a result of increasing the Q value of the vibration of the movable portion, it is possible to reduce power consumption. In addition, as a result of decreasing the Q value of the vibration of the frame body portion, it is possible to reduce unintentional vibration that arises due to resonance of the frame body portion when the frame body portion is caused to oscillate in non-resonance, and as a result, it is possible to improve optical scanning characteristics. Moreover, as a result of the relationship corresponding to $L1/L3<5$ being satisfied, it is possible to prevent an increase in the size of the frame body portion, and as a result of this, it is possible to effectively reduce the power consumption of the optical scanner.

In the optical scanner according to the aspect of the invention, it is preferable that, when an inner peripheral edge of the support portion has a section that extends along a side surface of the second axis portion, and a distance between the section and the side surface of the second axis portion is defined as $L2$, a relationship corresponding to $L1>L2$ be satisfied.

As a result of the inner peripheral edge of the support portion having a portion that extends along the side surface of the second axis portion in a planar view, it is possible to form the external form of the second axis portion with high accuracy by using etching. In addition, as a result the relationship corresponding to $L1>L2$ being satisfied, it is possible to make the distance $L2$ and the distance $L3$ equivalent, and as a result of this, it is possible to easily form the external form of the frame body portion together with the external form of the second axis portion by using etching.

In the optical scanner according to the aspect of the invention, it is preferable that the inner peripheral edge of the support portion have a section that extends along an outer peripheral edge of the frame body portion in a planar view.

In this case, it is possible to form the external form of the frame body portion with high accuracy by using etching.

In the optical scanner according to the aspect of the invention, it is preferable that a relationship corresponding to 2<L1/L3 be satisfied.

In this case, it is possible to configure an optical scanner having excellent optical scanning characteristics, to further reduce the power consumption of the optical scanner, and the like.

In the optical scanner according to the aspect of the invention, it is preferable that, when an inner peripheral edge of the frame body portion has a section that extends along a side surface of the first axis portion, and a distance between the section and the side surface of the first axis portion is defined as L4, a relationship corresponding to L1>L4 be satisfied.

As a result of the inner peripheral edge of the frame body portion having a portion that extends along the side surface of the first axis portion in a planar view, it is possible to form the external form of the first axis portion with high accuracy by using etching. In addition, as a result of the relationship corresponding to L1>L4 being satisfied, it is possible to make the distance L3 and the distance L4 equivalent, and as a result of this, it is possible to easily form the external form of the frame body portion together with the external form of the first axis portion by using etching.

It is preferable that the optical scanner according to the aspect of the invention further include a space formation member that is separated from the frame body portion, is disposed overlapping the frame body portion in a planar view, and forms a space with the frame body portion.

In this case, it is possible to increase the air resistance borne when the frame body portion oscillates around the second oscillation axis. As a result of this, it is possible to further improve the optical scanning characteristics.

In the optical scanner according to the aspect of the invention, it is preferable that the space formation member not overlap with at least a portion of the movable portion in a planar view.

In this case, the incidence of light to the light reflecting portion and the emission of light from the light reflecting portion are made possible, and it is possible to reduce the air resistance borne when the movable portion oscillates around the first oscillation axis.

In the optical scanner according to the aspect of the invention, it is preferable that the movable portion oscillate in resonance around the first oscillation axis, and the frame body portion oscillate in non-resonance around the second oscillation axis.

In this case, it is possible to cause the movable portion and the frame body portion to oscillate in non-resonance around the second oscillation axis by applying a drive force to the frame body portion, and to efficiently cause the movable portion to oscillate in resonance around the first oscillation axis. In this manner, in a case in which the movable portion is caused to oscillate in resonance and the frame body portion is caused to oscillate in non-resonance, if the Q value of the vibration of the frame body portion is high, unintentional vibration occurs due to the resonance of the frame body portion, and this leads to adverse effects on the optical scanning characteristics. Accordingly, in such a case, reducing the Q value of the frame body portion is particularly effective in realizing excellent optical scanning characteristics.

According to another aspect of the invention, there is provided an image display device including the optical scanner according to the aspect of the invention.

According to such an image display device, an image display device having excellent image quality is configured and the power consumption of the optical scanner is reduced, and consequently, it is possible to reduce the power consumption of the image display device.

According to still another aspect of the invention, there is provided a head-mounted display including the optical scanner according to the aspect of the invention.

According to such a head-mounted display, a head-mounted display having excellent image quality is configured and the power consumption of the optical scanner is reduced, and consequently, it is possible to reduce the power consumption of the head-mounted display.

According to still another aspect of the invention, there is provided a heads-up display including the optical scanner according to the aspect of the invention.

According to such a heads-up display, a heads-up display having excellent image quality is configured and the power consumption of the optical scanner is reduced, and consequently, it is possible to reduce the power consumption of the heads-up display.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of an optical scanner, an image display device, a head-mounted display, and a heads-up display will be described with reference to the appended drawings.

Optical Scanner

First Embodiment

Figure 1:
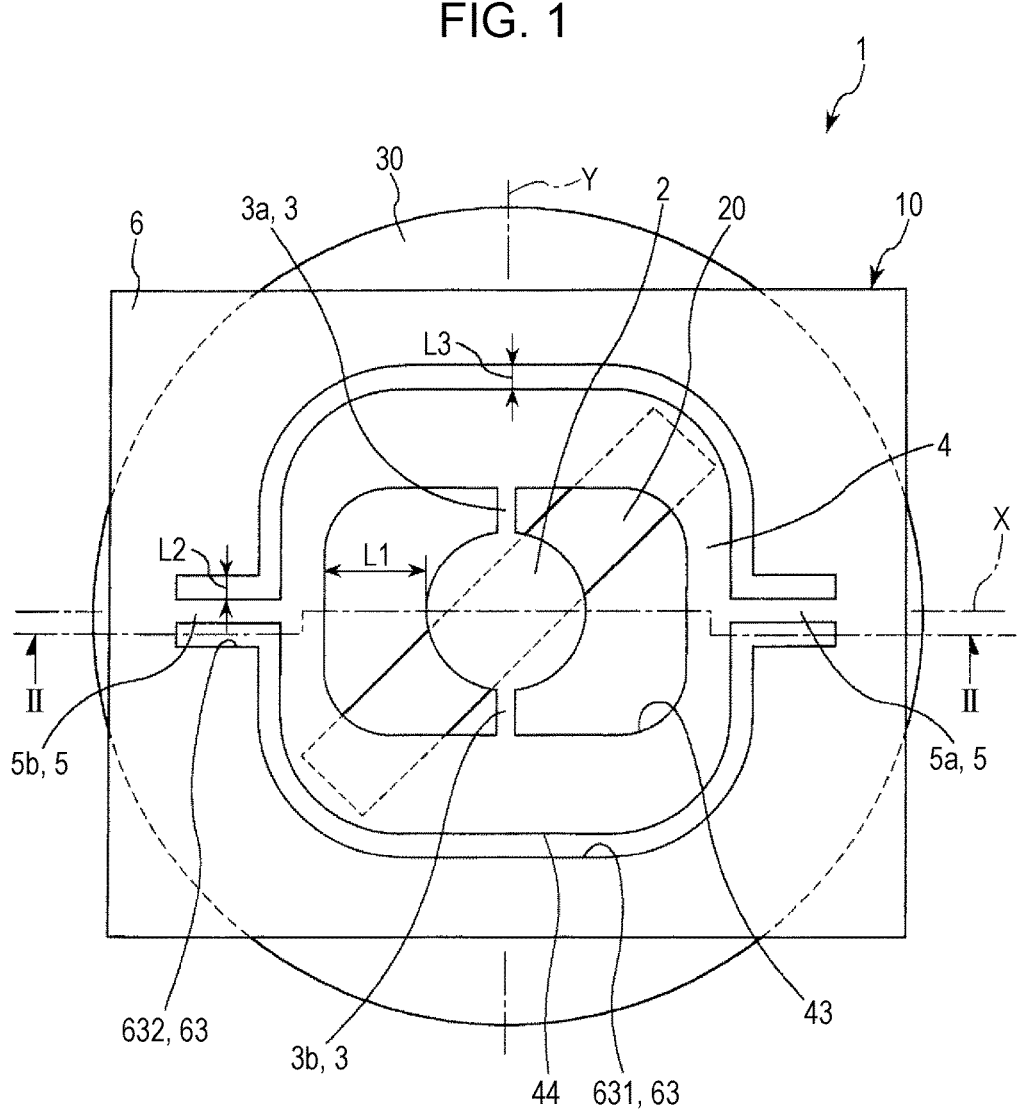
FIG. 1 is a plan view that shows an optical scanner according to a first embodiment of the invention.
Figure 2:
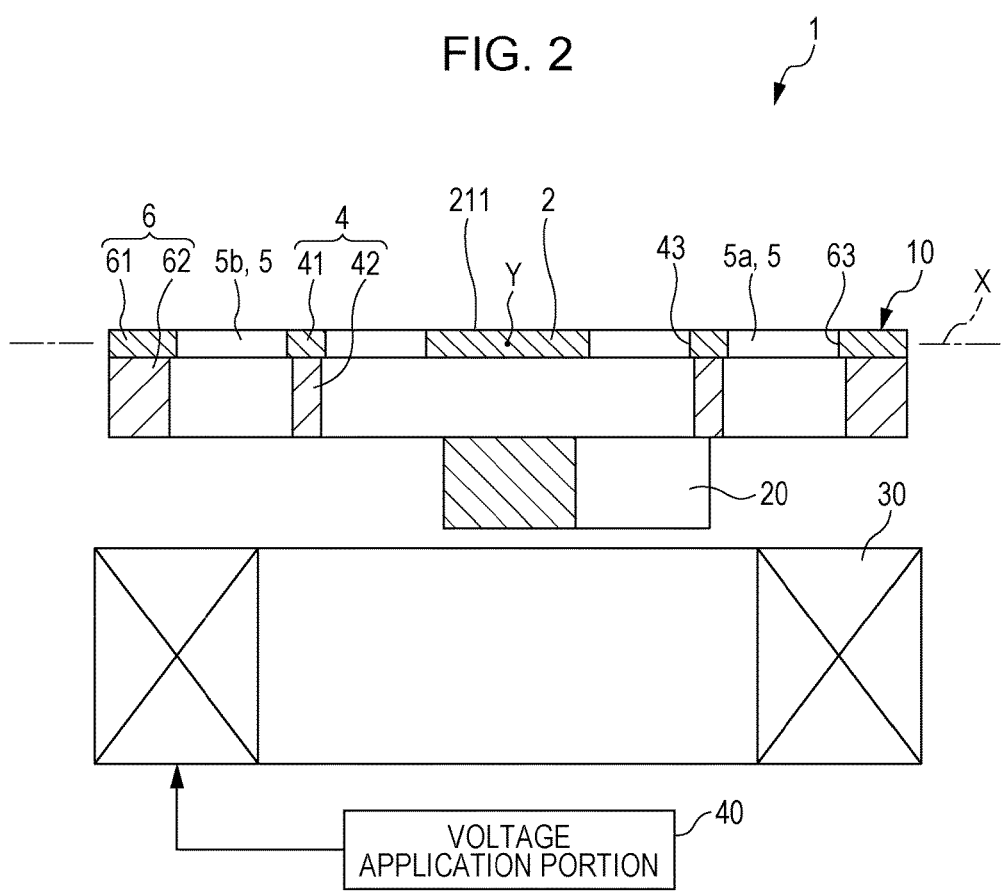
FIG. 2 is a cross-sectional view taken along line II-II in FIG. 1.
Figure 3:
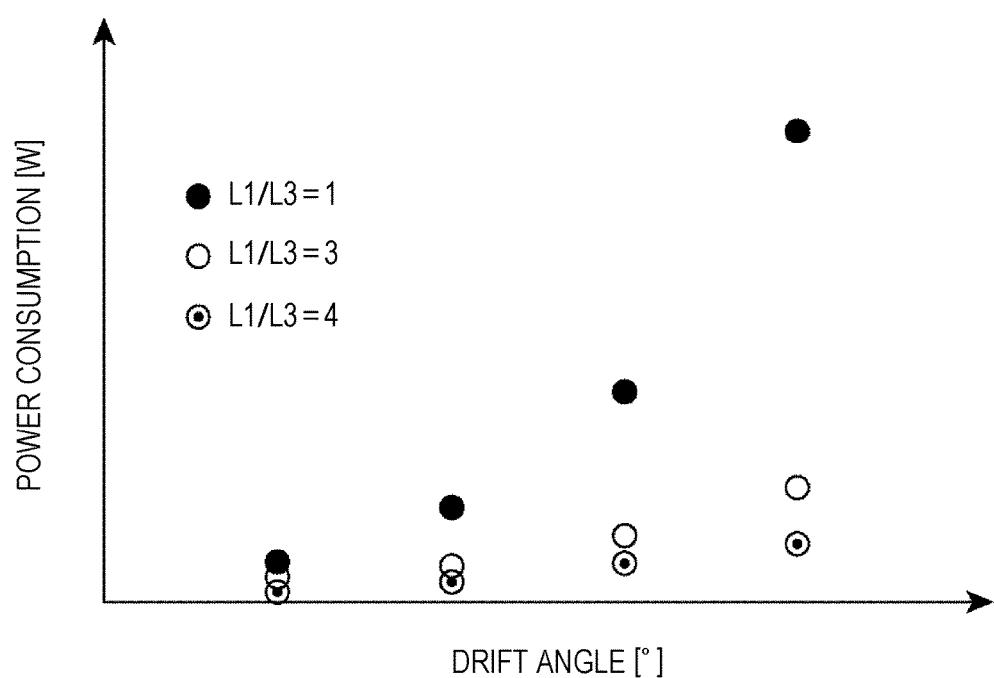
FIG. 3 is a graph that shows a relationship between a drift angle around the first oscillation axis of the movable portion and power consumption in the optical scanner shown in FIG. 1.

FIG. 1 is a plan view that shows an optical scanner according to a first embodiment of the invention. FIG. 2 is a cross-sectional view taken along line II-II in FIG. 1. FIG. 3 is a graph that shows a relationship between a drift angle around the first oscillation axis of the movable portion and power consumption in the optical scanner shown in FIG. 1. Additionally, hereinafter, for convenience of description, the upper side in FIG. 2 will be referred to as "up", and the lower side "down".

An optical scanner 1 shown in FIGS. 1 and 2 is provided with a structural body 10 having a vibration system, a permanent magnet 20 that is joined to a lower portion of the structural body 10, a coil 30 that is disposed facing the permanent magnet 20 toward a side opposite the structural body 10, and a voltage application portion 40 electrically connected to the coil 30.

As shown in FIG. 1, the structural body 10 is provided with a movable portion 2, a first axis portion 3, a frame body portion 4, a second axis portion 5, and a support portion 6. The shape of the structural body 10 when viewed in a planar manner is linearly symmetric to an axis line X and is linearly symmetric to an axis line Y. Accordingly, a distance L2 and a distance L3, which will be mentioned later, are respectively equivalent at positions that are symmetric to the axis line X, and a distance L1 and a distance L4, which will be mentioned later, are respectively equivalent at positions that are symmetric to the axis line Y.

In such a structural body 10, the movable portion 2 and the first axis portion 3 configure a first vibration system, which is a torsional vibration system in which the movable portion 2 is set as a "first mass" and the first axis portion 3 is set as a "first spring" that deforms in a torsional manner around the axis line Y (a first oscillation axis). In addition, the movable portion 2, the first axis portion 3, the frame body portion 4, the second axis portion 5, and the permanent magnet 20 configure a second vibration system, which is a torsional vibration system in which the movable portion 2, the first axis portion 3, the frame body portion 4, and the permanent magnet 20 are set as an integral "second mass" and the second axis portion 5 is set as a "second spring" that deforms in a torsional manner around the axis line X (a second oscillation axis). Further, the permanent magnet 20, the coil 30, and the voltage application portion 40 configure a "drive portion" that causes the first vibration system and the second vibration system mentioned above to vibrate at different frequencies to one another, and causes the movable portion 2 to oscillate (pivot in a reciprocating manner) around the axis line X and the axis line Y as a result of mutual interaction of the magnetic fields of the permanent magnet 20 and the coil 30. Hereinafter, firstly, each portion of the optical scanner 1 will be briefly described in order.

As shown in FIG. 2, the movable portion 2 (a movable plate) has a plate form, and a light reflecting portion 211, which has a light reflecting property, is provided on the upper surface thereof (one surface). The light reflecting portion 211 may be the upper surface itself of the movable portion 2, but for example, may, according to necessity, be configured by using a metal film such as aluminum. In the present embodiment, the movable portion 2 constitutes a circular form in a planar view from a thickness direction of the movable portion 2 or the frame body portion 4 (hereinafter, simply referred to as "in a planar view"). Additionally, a plan view shape of the movable portion 2 is not limited to this configuration, and for example, may be elliptical, or polygonal such as rectangular, hexagonal, and octagonal.

As shown in FIG. 1, when viewed in a planar manner, the entirety (or a portion thereof) of such a movable portion 2 is surrounded by the frame form frame body portion 4. Further, the movable portion 2 is oscillatably supported around the axis line Y by the frame body portion 4 via the first axis portion 3. In addition, the frame body portion 4 is oscillatably supported around the axis line X, which is orthogonal to the axis line Y, by the support portion 6 via the second axis portion 5. In this manner, the components are disposed in an order of the support portion 6, the frame body portion 4 and the movable portion 2 from the outer side toward the inner side when viewed in a planar manner.

The frame body portion 4 constitutes a shape in which a gap from the movable portion 2 is greater than a gap between the frame body portion 4 and the support portion 6 when viewed in a planar manner. As a result of this, the air resistance borne when the movable portion 2 oscillates around the axis line Y is decreased, and therefore, it is possible to reduce the power consumption of the optical scanner 1. In addition, the air resistance borne when the frame body portion 4 pivots around the axis line X is increased, and therefore, it is possible to improve the optical scanning characteristics of the optical scanner 1. Additionally, the above-mentioned feature will be explained in detail later.

In addition, as shown in FIG. 2, the frame body portion 4 has a main body portion 41 and a rib 42 that is joined to the lower surface of the main body portion 41. The rib 42 projects from the main body portion 41 to a side that is lower than the first axis portion 3 and the second axis portion 5. As a result of this, it is possible to enhance the rigidity of the frame body portion 4. In addition, the rib 42 also has a function of controlling so that the movable portion 2 does not come into contact with the permanent magnet 20 (a function as a spacer).

The first axis portion 3 is configured by a pair of first axis portions 3a and 3b that extend in a direction following the axis line Y from both end portions of the movable portion 2 in a direction following the axis line Y. The pair of first axis portions 3a and 3b are provided concentrically with one another, and function as torsion bars that deform in a torsional manner in accordance with oscillation of the movable portion 2 around the axis line Y with respect to the frame body portion 4. Meanwhile, the second axis portion 5 is configured by a pair of second axis portions 5a and 5b that extend in a direction following the axis line X from both end portions of the main body portion 41 of the frame body portion 4 in a direction following the axis line X. The pair of second axis portions 5a and 5b are provided concentrically with one another, and function as torsion bars that deform in a torsional manner in accordance with oscillation of the frame body portion 4 around the axis line X with respect to the support portion 6. Additionally, in the illustration, the first axis portions 3a and 3b and the second axis portions 5a and 5b respectively constitute shapes that extend in a linear manner (rod forms), but are not limited to this configuration, and for example, may have bent or curved sections, branched sections, or sections having different widths in at least one location midway therealong.

The support portion 6 is provided so as to surround an entirety (or a portion thereof) of the above-mentioned structure composed of the movable portion 2, the first axis portion 3, the frame body portion 4, and the second axis portion 5 when viewed in a planar manner. In the present embodiment, the support portion 6 constitutes a shape that follows the external forms of the frame body portion 4 and the second axis portion 5 when viewed in a planar manner. In particular, the support portion 6 constitutes a shape in which the gap between the frame body portion 4 and the second axis portion 5 is constant when viewed in a planar manner. As a result of this, it is possible to form the frame body portion 4 and the second axis portion 5 simply and with high accuracy by using etching. Additionally, the plan view shape of the support portion 6 is not limited to the illustrated shape, and for example, may have a section in which the gap between the frame body portion 4 and the second axis portion 5 differs when viewed in a planar manner.

In addition, as shown in FIG. 2, the support portion 6 has a main body portion 61 and a reinforcing portion 62 that is joined to the lower surface of the main body portion 61. The reinforcing portion 62 projects from the main body portion 61 to a side that is lower than the second axis portion 5. As a result of this, it is possible to enhance the rigidity of the support portion 6.

The movable portion 2, the first axis portion 3, the main body portion 41 of the frame body portion 4, the second axis portion 5, and the main body portion 61 of the support portion 6, which are described above, have equivalent thicknesses to one another and are formed in an integral manner by using silicon. In addition, the rib 42 of the frame body portion 4 and the reinforcing portion 62 of the support portion 6 have equivalent thicknesses to one another and are respectively configured by silicon. Such a movable portion 2, first axis portion 3, frame body portion 4, second axis portion 5, and support portion 6 are formed by etching an SOI substrate obtained by stacking a device layer configured by silicon, a box layer configured by a silicon oxide film, and a handle layer configured by silicon in this order. As a result of this, it is possible to comparatively easily form the movable portion 2, the first axis portion 3, the frame body portion 4, the second axis portion 5, and the support portion 6 in a compact manner having excellent dimensional precision.

In this instance, the movable portion 2, the first axis portion 3, the main body portion 41, the second axis portion 5, and the main body portion 61 are configured by the device layer of the SOI substrate. In addition, the rib 42 and the reinforcing portion 62 are configured by the handle layer of the SOI substrate. In addition, although not illustrated in the drawings, a joining layer, which is configured by the box layer of the SOI substrate, is respectively interposed between the main body portion 41 of the frame body portion 4 and the rib 42, and the main body portion 61 of the support portion 6 and the reinforcing portion 62. Additionally, the constituent materials and formation methods of the movable portion 2 and the first axis portion 3, and the frame body portion 4, the second axis portion 5, and the support portion 6, which are mentioned above, are merely examples, and the invention is not limited to these examples. For example, the movable portion 2, the first axis portion 3, the frame body portion 4, the second axis portion 5, and the support portion 6 may be formed by etching a single silicon substrate.

The permanent magnet 20 is joined to the lower surface (a surface on the side opposite the light reflecting portion 211), that is a tip end surface of the rib 42, of the frame body portion 4 that such a structural body 10 includes. The joining method thereof is not particularly limited, but for example, it is possible to use a joining method that uses an adhesive agent.

The permanent magnet 20 is magnetized in a direction that is inclined relative to the axis line X and the axis line Y when viewed in a planar manner. In the present embodiment, the permanent magnet 20 constitutes a longitudinal shape (a rod form) that extends in a direction that is inclined relative to the axis line X and the axis line Y. Further, the permanent magnet 20 is magnetized in the longer side direction. That is, the permanent magnet 20 is magnetized so that one end portion thereof is configured as an S pole and the other end portion thereof is configured as an N pole. For example, a neodymium magnet, a ferrite magnet, a samarium cobalt magnet, an alnico magnetic, a bonded magnet, or the like, can be suitably used as such a permanent magnet 20.

In addition, an angle of inclination θ in a direction of magnetization (a direction of extension) of the permanent magnet 20 with respect to the axis line X when viewed in a planar manner is not particularly limited, but is preferably at least 30° and at most 60°. In this manner, by providing the permanent magnet 20, it is possible to smoothly and reliably cause the movable portion 2 to pivot around the axis line X and the axis line Y.

The coil 30 is provided directly below the permanent magnet 20. That is, the coil 30 is provided so as to face the lower surface of the frame body portion 4. The coil 30 is electrically connected to the voltage application portion 40. Further, a magnetic field in a direction orthogonal to the axis line X and the axis line Y is generated from the coil 30 as a result of a voltage being applied to the coil 30 by the voltage application portion 40.

Although not illustrated in the drawings, the voltage application portion 40 is provided with a first drive circuit that causes a first voltage (a horizontal scan drive signal) for causing the movable portion 2 to pivot around the axis line Y to be generated, a second drive circuit that causes a second voltage (a vertical scan drive signal) for causing the movable portion 2 to pivot around the axis line X to be generated, and an adder that overlaps the first voltage and the second voltage. Further, the voltage application portion 40 inputs a voltage obtained by overlapping the first voltage and the second voltage to the coil 30. In this instance, the first voltage and the second voltage are signals for which the voltages respectively change in different periods from one another. More specifically, for example, the frequency of the first voltage is set to be equivalent to a torsional resonance frequency of the first vibration system, which is mentioned above, and the frequency of the second voltage is set so as to be a value that is different from the torsional resonance frequency of the second vibration system and so as to be less than the frequency of the first voltage. For example, the frequency of the first voltage is set to be approximately at least 10 kHz and at most 40 kHz, and the frequency of the second voltage is set to be approximately at least 30 Hz and at most 120 Hz.

When such a voltage obtained by overlapping the first voltage and the second voltage is input to the coil 30, a magnetic field is generated from the coil 30, an electromagnetic force is applied to the permanent magnet 20, which is within the magnetic field, and the movable portion 2 oscillates around the axis line Y at the frequency of the first voltage and oscillates around the axis line X at the frequency of the second voltage. At this time, the movable portion 2 oscillates in resonance around the axis line Y, and, on the other hand, the frame body portion 4 oscillates in non-resonance around the axis line X. Additionally, in this instance, in addition to a case of oscillating (vibrating) at a frequency that exactly matches a resonance frequency, the term "resonance" also includes a case of oscillating (vibrating) at a frequency slightly shifted from the resonance frequency.

Each portion of the optical scanner 1 has been briefly described above. Hereinafter, air resistance in the optical scanner 1 will be explained in detail.

The above-mentioned optical scanner 1 is provided with the movable portion 2 having the light reflecting portion 211 that reflects light, the frame body portion 4 provided surrounding at least a portion of the movable portion 2 when the movable portion 2 is viewed in a planar manner from the thickness direction, the first axis portion 3 that connects the movable portion 2 and the frame body portion 4 and oscillatably supports the movable portion 2 around the axis line Y, which is the "first oscillation axis", a support portion 6 provided surrounding at least a portion of the frame body portion 4 when viewed in a planar manner, and the second axis portion 5 that connects the frame body portion 4 and the support portion 6 and oscillatably supports the frame body portion 4 around the axis line X, which is the "second oscillation axis" that intersects (is orthogonal to) the axis line Y.

In this instance, in the above-mentioned manner, as a result of the voltage application portion 40 inputting a drive signal to the coil 30, the movable portion 2 oscillates in resonance around the axis line Y and the frame body portion 4 oscillates in non-resonance around the axis line X due to mutual interaction of the magnetic fields from the permanent magnet 20 and the coil 30. As a result of this, it is possible to cause the movable portion 2 and the frame body portion 4 to oscillate in non-resonance around the axis line X by applying a drive force to the frame body portion 4, and to efficiently cause the movable portion 2 to oscillate in resonance around the axis line Y. In this manner, in a case in which the movable portion 2 is caused to oscillate in resonance and the frame body portion 4 is caused to oscillate in non-resonance, if the Q value of the vibration of the frame body portion 4 is high, unintentional vibration occurs due to the resonance of the frame body portion 4, leading to adverse effects on the optical scanning characteristics. It is considered that the reason for this is that some of the frequency components among the various frequency components included in the above-mentioned drive signal match the resonance frequency of the frame body portion 4. In addition, since the permanent magnet 20 is attached to the frame body portion 4, the moment of inertia increases, and therefore, it is likely that the Q value will increase. Accordingly, in such a case, reducing the Q value of the frame body portion 4 is particularly effective in realizing excellent optical scanning characteristics.

In such an instance, in the above-mentioned manner, the frame body portion 4 constitutes a shape in which a gap from the movable portion 2 is greater than a gap between the frame body portion 4 and the support portion 6 when viewed in a planar manner. That is, when a distance between an end portion of the movable portion 2 in a direction following the axis line X when viewed in a planar manner and the frame body portion 4 is defined as L1, and a distance between an end portion of the frame body portion 4 in a direction following the axis line Y and the support portion 6 is defined as L3, a relationship corresponding to 1<L1/L3 is satisfied. As a result of this, it is likely that air will escape from between the movable portion 2 and the frame body portion 4, and therefore, it is possible to decrease the air resistance borne when the movable portion 2 oscillates around the axis line Y, and it is unlikely that air will escape from between the frame body portion 4 and the support portion 6, and therefore, it is possible to increase the air resistance borne when the frame body portion 4 oscillates around the axis line X. Therefore, it is possible to increase the Q value of oscillation (vibration) of the movable portion 2 around the axis line Y, and to decrease the Q value of oscillation (vibration) of the frame body portion 4 around the axis line X. Further, as a result of increasing the Q value of the vibration of the movable portion 2, it is possible to reduce power consumption. In addition, as a result of decreasing the Q value of the vibration of the frame body portion 4, it is possible to reduce unintentional vibration that arises due to resonance of the frame body portion 4 when the frame body portion 4 is caused to oscillate in non-resonance, and as a result, it is possible to improve optical scanning characteristics.

As shown in FIG. 3, a tendency for the power consumption of the optical scanner 1 to decrease as L1/L3 increases is shown. This tendency becomes more pronounced as the drift angle (the oscillation angle) of the movable portion 2 around the axis line Y increases. However, not only does the effect of the power consumption of the optical scanner 1 being decreased not increase any further if L1/L3 is at least 5, but it is necessary to increase the dimensions of the frame body portion 4 (in particular, the length in a direction following the axis line X). An increase in the dimensions of the frame body portion 4 leads to an increase in the size of the entire optical scanner 1 and an increase in the drive force required in order to cause the frame body portion 4 to oscillate around the axis line X, and therefore, this leads to an increase in the power consumption of the optical scanner 1.

In such an instance, the optical scanner 1 satisfies a relationship corresponding to L1/L3<5. As a result of this, it is possible to prevent an increase in the size of the frame body portion 4, and as a result of this, it is possible to effectively reduce the power consumption of the optical scanner 1.

In this manner, as a result of the relationship corresponding to 1<L1/L3<5 being satisfied, it is possible to reduce the power consumption of the optical scanner 1 while configuring an optical scanner 1 having excellent optical scanning characteristics.

In this instance, L1 and L3 may satisfy the relationship corresponding to 1<L1/L3<5, but it is preferable that 2<L1/L3 be satisfied. As a result of this, it is possible to configure an optical scanner having excellent optical scanning characteristics, to further reduce the power consumption of the optical scanner 1, and the like.

In the present embodiment, an inner peripheral edge 43 of the frame body portion 4 constitutes a shape (a shape in which each corner portion of a rectangle is rounded in the illustration) that follows an outer peripheral edge 44 of the frame body portion 4 when viewed in a planar manner. As a result of this, it is possible to increase the surface area of the space surrounded by the movable portion 2, the first axis portion 3, and the frame body portion 4 when viewed in a planar manner. Therefore, it is possible to sufficiently decrease the air resistance borne when the movable portion 2 oscillates around the axis line Y. In addition, when the inner peripheral edge 43 of the frame body portion 4 constitutes the shape that follows the outer peripheral edge 44 of the frame body portion 4 when viewed in a planar manner, there is an advantage in that formation of the frame body portion 4 using etching is easy. Additionally, the shapes of the inner peripheral edge 43 and the outer peripheral edge 44 of the frame body portion 4 when viewed in a planar manner are respectively not limited to the illustrated shapes, and for example, may also be polygonal such as rectangular or hexagonal, circular, elliptical, or the like. In addition, the shape of the inner peripheral edge 43 of the frame body portion 4 when viewed in a planar manner can be established as appropriate in accordance with the plan view shape of the movable portion 2.

In the illustration, the distance L1 is greater than the length of the first axis portion 3 (each first axis portion 3a and 3b), but is preferably at least 0.3 times and at most 1.5 times the length of the first axis portion 3, and is more preferably at least 0.4 times and at most 1.2 times the length of the first axis portion 3. As a result of this, design of the first axis portion 3 is easy, and it is possible to prevent an increase in the size of the frame body portion 4. Additionally, in the illustration, the distance between the movable portion 2 and the frame body portion 4 when viewed in a planar manner differs depending on the position in the circumferential direction of the movable portion 2 or the frame body portion 4, but there may be a section that is constant and does not depend on the position in the circumferential direction.

In addition, in the manner described above, the support portion 6 constitutes a shape in which the gap between the frame body portion 4 and the second axis portion 5 is constant when viewed in a planar manner. That is, the outer peripheral edge 44 of the frame body portion 4 constitutes a shape that follows an inner peripheral edge 63 of the support portion 6 and a side surface of the second axis portion 5. As a result of this, it is possible to form the frame body portion 4 and the second axis portion 5 simply and with high accuracy by using etching. In addition, as a result of the gap between the frame body portion 4 and the support portion 6 being constant when viewed in a planar manner, it is possible to easily increase the air resistance borne when the frame body portion 4 oscillates around the axis line X.

In this manner, the inner peripheral edge 63 of the support portion 6 has a section 632 that extends along the side surface of the second axis portion 5 when viewed in a planar manner. As a result of this, it is possible to form the external form of the second axis portion 5 with high accuracy by using etching. In addition, when the distance between the section 632 and the side surface of the second axis portion 5 is defined as L2, a relationship corresponding to L1>L2 is satisfied. As a result of this, it is possible to make the distance L2 and the distance L3 equivalent, and as a result of this, it is possible to easily form the external form of the frame body portion 4 together with the external form of the second axis portion 5 by using etching. That is, from a viewpoint of easily forming the external form of the frame body portion 4 together with the external form of the second axis portion 5, it is preferable that the distance L2 and the distance L3 be equivalent to one another.

In this instance, the inner peripheral edge 63 of the support portion 6 has a section 631 that extends along the outer peripheral edge 44 of the frame body portion 4. As a result of this, it is possible to form the external form of the frame body portion 4 with high accuracy by using etching. Additionally, the shape of the inner peripheral edge 63 of the support portion 6 when viewed in a planar manner is not limited to the illustrated shape, and for example, can be established as appropriate in accordance with the plan view shape of the outer peripheral edge 44 of the frame body portion 4.

Second Embodiment

Figure 4:
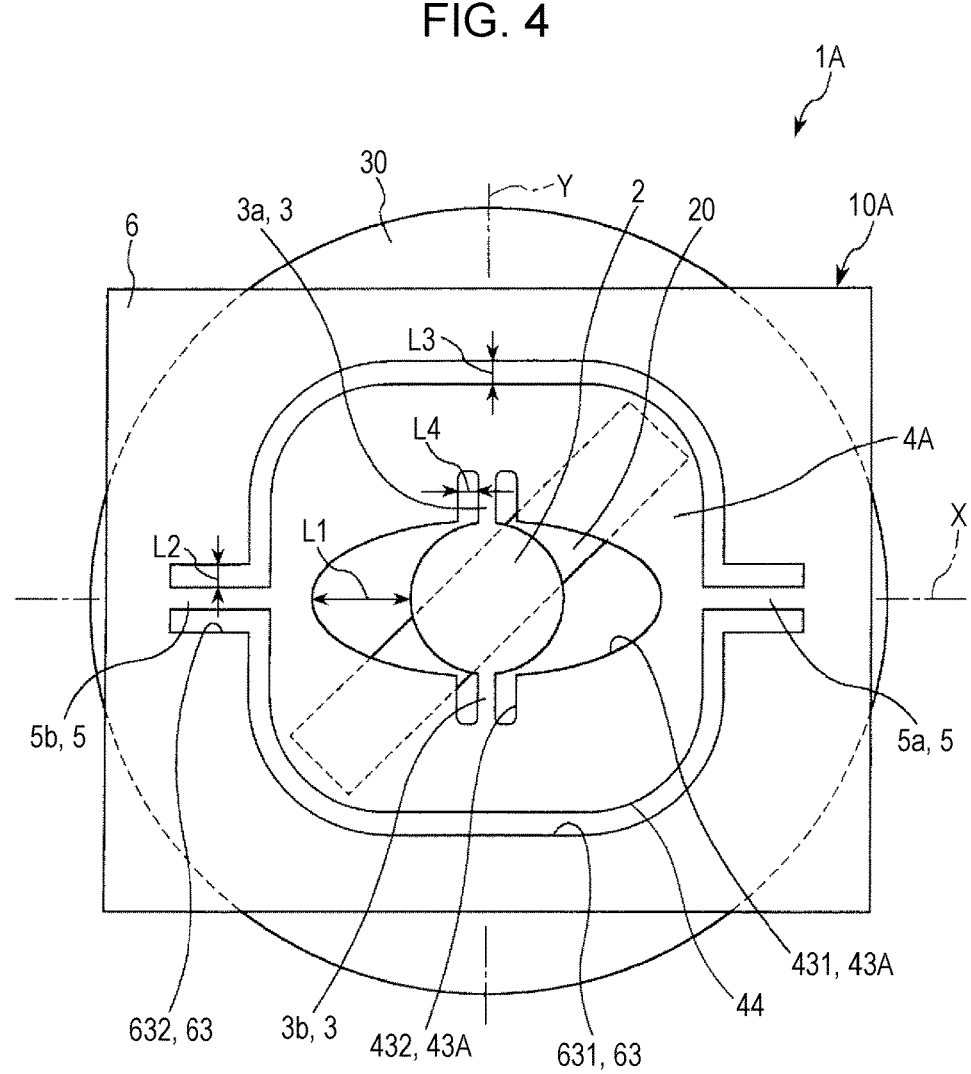
FIG. 4 is a plan view that shows an optical scanner according to a second embodiment of the invention.

FIG. 4 is a plan view that shows an optical scanner according to a second embodiment of the invention.

Hereinafter, the present embodiment will be described focusing on the differences from the above-mentioned embodiment, and the description of like matters will be omitted.

Other than the fact that the shape of the inner peripheral edge of the frame body portion when viewed in a planar manner is different, the optical scanner of the present embodiment is similar to that of the above-mentioned first embodiment. Additionally, in FIG. 4, similar configurations to those of the above-mentioned embodiment are given identical reference symbols.

An optical scanner 1A shown in FIG. 4 is provided with a structural body 10A in place of the structural body 10 of the above-mentioned first embodiment. The structural body 10A has a frame body portion 4A in place of the frame body portion 4 that the above-mentioned structural body 10 includes.

An inner peripheral edge 43A of the frame body portion 4A has sections 431 that are positioned on both sides in a direction following the axis line X relative to the movable portion 2 when viewed in a planar manner, and sections 432 that are positioned on both sides in a direction following the axis line X relative to the first axis portion 3. The sections 431 spread in directions of separation from the movable portion 2, and as a result of this, the distance L1 is greater than the distance L3. In addition, the sections 432 extend along the side surface of the first axis portion 3, and as a result of this, a gap formed between the first axis portion 3 and the frame body portion 4 is decreased. Additionally, the shape of the inner peripheral edge 43A of the frame body portion 4A when viewed in a planar manner is not limited to the illustrated shape, and for example, may be polygonal such as rectangular, hexagonal, or the like. In addition, the shape of the inner peripheral edge 43A of the frame body portion 4A when viewed in a planar manner can be established as appropriate in accordance with the plan view shape of the movable portion 2.

In this manner, the inner peripheral edge 43A of the frame body portion 4A when viewed in a planar manner has the sections 432 that extend along the side surface of the first axis portion 3. As a result of this, it is possible to form the external form of the first axis portion 3 with high accuracy by using etching. In addition, when the distance between the sections 432 and the side surface of the first axis portion 3 is defined as L4, a relationship corresponding to L1>L4 is satisfied. As a result of this, it is possible to make the distance L3 and the distance L4 equivalent, and as a result of this, it is possible to easily form the external form of the frame body portion 4A together with the external form of the first axis portion 3 by using etching. That is, from a viewpoint of easily forming the external form of the frame body portion 4A together with the external form of the first axis portion 3 by using etching, it is preferable that the distance L3 and the distance L4 be equivalent to one another. In a similar manner, from a viewpoint of easily forming the external form of the second axis portion 5 together with the external form of the first axis portion 3 by using etching, it is preferable that the distance L2 and the distance L4 be equivalent to one another. In addition, it is possible to increase the surface area of the frame body portion 4A by using the sections 432 that extend along the side surface of the first axis portion 3, and therefore, the air resistance borne when the frame body portion 4A pivots around the axis line X is increased, and it is possible to improve the optical scanning characteristics of the optical scanner 1A.

In a similar manner to that described above, it is also possible to reduce the power consumption of the optical scanner 1A while configuring an optical scanner 1A having excellent optical scanning characteristics according to the second embodiment.

Third Embodiment

Figure 5:
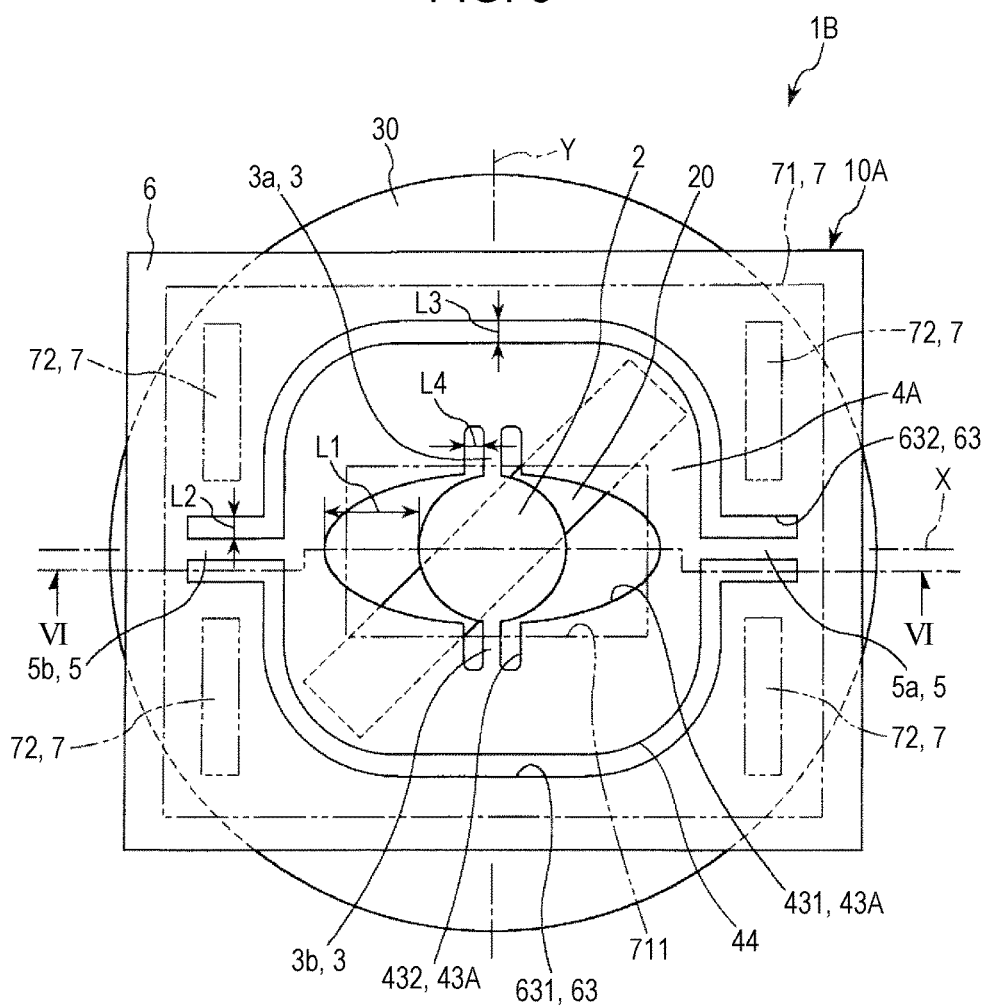
FIG. 5 is a plan view that shows an optical scanner according to a third embodiment of the invention.
Figure 6:
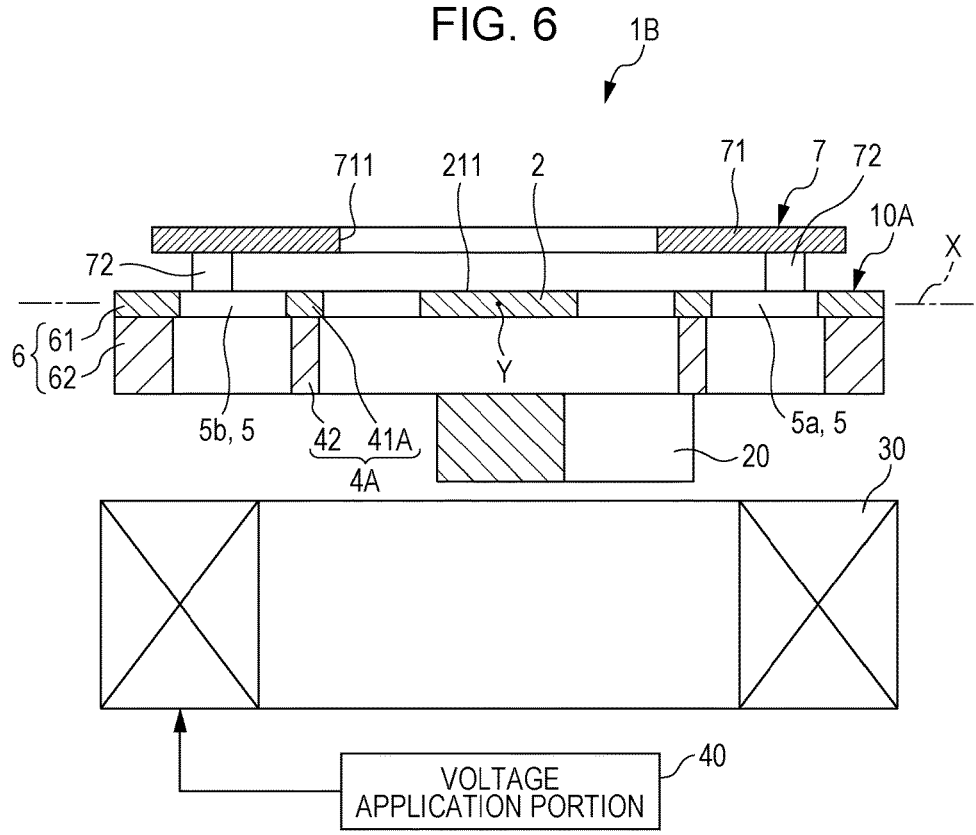
FIG. 6 is a cross-sectional view taken along line VI-VI in FIG. 5.

FIG. 5 is a plan view that shows an optical scanner according to a third embodiment of the invention. FIG. 6 is a cross-sectional view taken along line VI-VI in FIG. 5.

Hereinafter, the present embodiment will be described focusing on the differences from the above-mentioned embodiment, and the description of like matters will be omitted.

Other than the facts that the shape of the inner peripheral edge of the frame body portion when viewed in a planar manner is different and a space formation member is added, the optical scanner of the present embodiment is similar to that of the above-mentioned first embodiment. In addition, other than the fact that the space formation member is added, the optical scanner of the present embodiment is similar to that of the above-mentioned second embodiment. Additionally, in FIGS. 5 and 6, similar configurations to those of the above-mentioned embodiments are given identical reference symbols.

An optical scanner 1B shown in FIG. 5 is provided with the structural body 10A similar to that of the above-mentioned second embodiment, and a space formation member 7 disposed on the structural body 10A. The space formation member 7 has a plate form main body 71, and a plurality of support portions 72 that support the main body 71 relative to the structural body 10A. An opening portion 711, which passes through in the thickness direction, is provided in the main body 71 in a region that includes the movable portion 2 when viewed in a planar manner. In addition, the plurality of support portions 72 are respectively joined to the lower surface of the main body 71 and the upper surface of the support portion 6 by an adhesive agent (not illustrated in the drawings), for example. The support portions 72 have a function as spacers for forming spaces between the main body 71 and the structural body 10A.

The constituent materials of such a main body 71 and support portions 72 is not particularly limited, and examples thereof include a silicon material, a glass material, a resin material, and the like, but it is preferable to use a material that grants the main body 71 with a light-blocking property as the constituent material of at least the main body 71. As a result of this, it is possible to prevent stray light. Additionally, an antireflective film may also be provided on the upper surface of the main body 71. In addition, each support portion 72 extends along a direction following the axis line X in the illustration, but is not limited to the illustrated shape.

In this manner, the optical scanner 1B is provided with the space formation member 7 that is separated from the frame body portion 4A, is disposed overlapping the frame body portion 4A when viewed in a planar manner, and forms a space with the frame body portion 4A. As a result of this, it is possible to increase the air resistance borne when the frame body portion 4A oscillates around the axis line X. As a result of this, it is possible to further improve the optical scanning characteristics. Additionally, as shown in FIG. 6, the frame body portion 4A has a main body portion 41A having a different plan view shape to that of the main body portion 41 of the above-mentioned first embodiment, and a rib 42 that is joined to the lower surface of the main body portion 41A.

In addition, the space formation member 7 does not overlap with at least a portion of the movable portion 2 when viewed in a planar manner. As a result of this, the incidence of light to the light reflecting portion 211 and the emission of light from the light reflecting portion 211 are made possible, and it is possible to reduce the air resistance borne when the movable portion 2 oscillates around the axis line Y.

In a similar manner to that described above, it is also possible to reduce the power consumption of the optical scanner 1B while configuring an optical scanner 1B having excellent optical scanning characteristics according to the third embodiment.

Fourth Embodiment

Figure 7:
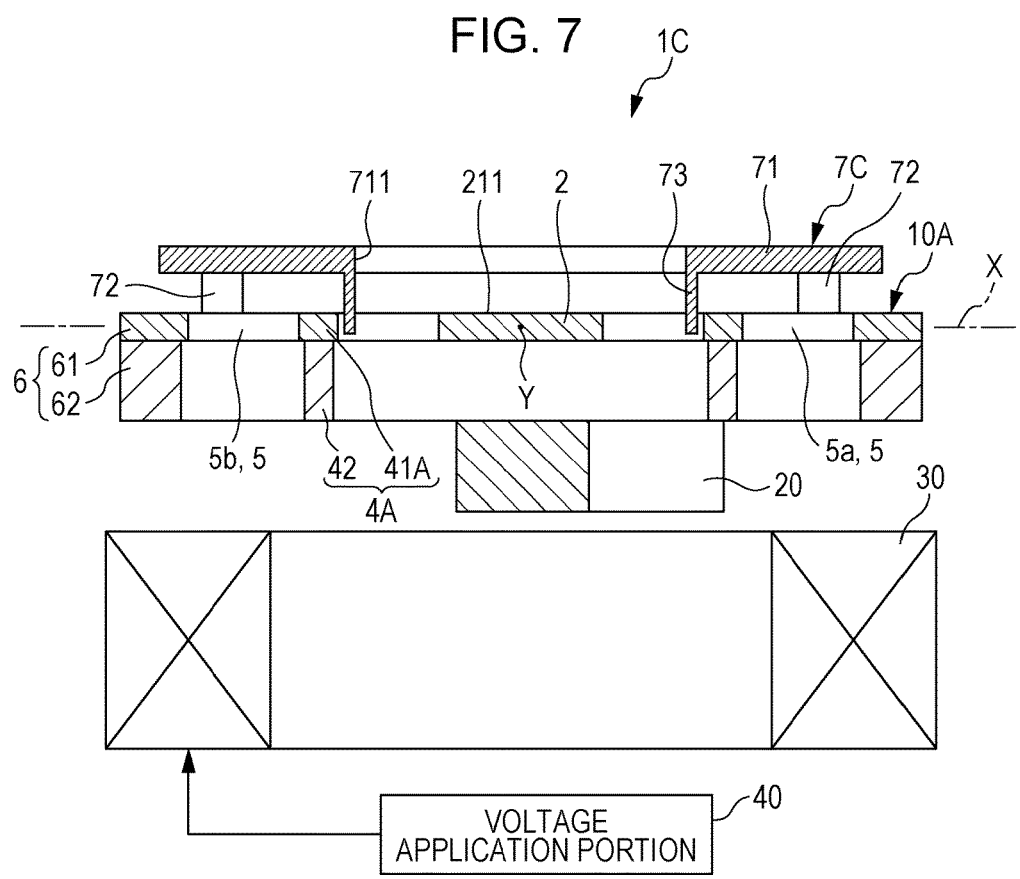
FIG. 7 is a cross-sectional view that shows an optical scanner according to a fourth embodiment of the invention.

FIG. 7 is a cross-sectional view that shows an optical scanner according to a fourth embodiment of the invention.

Hereinafter, the present embodiment will be described focusing on the differences from the above-mentioned embodiment, and the description of like matters will be omitted.

Other than the fact that the configuration of the space formation member is different, the optical scanner of the present embodiment is similar to that of the above-mentioned third embodiment. Additionally, in FIG. 7, similar configurations to those of the above-mentioned embodiment are given identical reference symbols.

An optical scanner 1C shown in FIG. 7 is provided with the structural body 10A similar to that of the above-mentioned second embodiment, and a space formation member 7C disposed on the structural body 10A. The space formation member 7C has the plate form main body 71, the plurality of support portions 72 that support the main body 71 relative to the structural body 10A, and projection portions 73 that extend to the structural body 10A side (the lower side) from the opening portion 711 of the main body 71. The projection portions 73 are formed so as to not be in contact with the frame body portion 4A, and have sections that penetrate into the inner side of the frame body portion 4A. As a result of providing such projection portions 73, it is possible to make the space between the space formation member 7C and the structural body 10A (or more specifically, the frame body portion 4A) close to an enclosed space. As a result of this, it is possible to significantly increase the air resistance borne when the frame body portion 4A oscillates around the axis line X.

In a similar manner to that described above, it is also possible to reduce the power consumption of the optical scanner 1C while configuring an optical scanner 1C having excellent optical scanning characteristics according to the fourth embodiment.

Embodiment of Image Display Device

Figure 8:
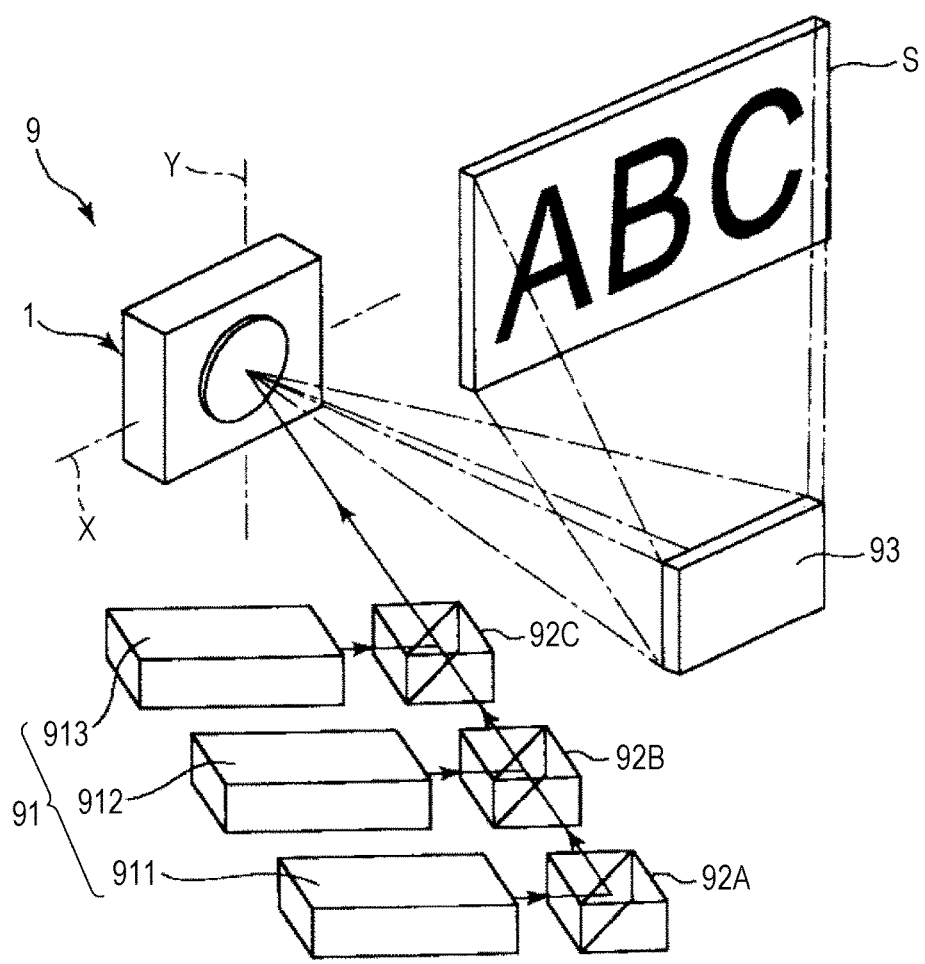
FIG. 8 is a view that schematically shows an image display device according to an embodiment of the invention.

FIG. 8 is a view that schematically shows an embodiment of an image display device of the invention.

In the present embodiment, a case in which the optical scanner 1 is used as an optical scanner of a display for imaging will be described as an example of an image display device. Additionally, a longer side direction of a screen S will be referred to as a "lateral direction", and a direction perpendicular to the longer side direction will be referred to as a "longitudinal direction". In addition, the axis line X is parallel to the lateral direction of the screen S, and the axis line Y is parallel to the longitudinal direction of the screen S.

An image display device (projector) 9 has a light source device (a light source) 91 that emits a light such as a laser, a plurality of dichroic mirrors 92A, 92B, and 92C, and the optical scanner 1.

The light source device 91 is provided with a red light source device 911 that emits red light, a blue light source device 912 that emits blue light, and a green light source device 913 that emits green light.

Each of the dichroic mirrors 92A, 92B, and 92C is an optical element that synthesizes the light respectively emitted from the red light source device 911, the blue light source device 912, and the green light source device 913.

Such an image display device 9 is configured so that light emitted from the light source device 91 (the red light source device 911, the blue light source device 912, and the green light source device 913) is respectively synthesized by the dichroic mirrors 92A, 92B, and 92C on the basis of image information from a host computer not illustrated in the drawings, the synthesized light is two-dimensionally scanned by the optical scanner 1, and a color image is formed on the screen S.

During the two-dimensional scanning, light reflected by the light reflecting portion 211 is scanned (a main scan) in the lateral direction of the screen S as a result of pivoting of the movable portion 2 of the optical scanner 1 around the axis line Y. Meanwhile, light reflected by the light reflecting portion 211 is scanned (a sub-scan) in the longitudinal direction of the screen S as a result of pivoting of the movable portion 2 of the optical scanner 1 around the axis line X.

Such an image display device 9 is provided with an optical scanner 1 such as that mentioned above. As a result of this, an image display device having excellent image quality is configured and the power consumption of the optical scanner 1 is reduced, and consequently, it is possible to reduce the power consumption of the image display device 9. Additionally, any one of the optical scanner 1A, 1B or 1C may also be used in place of the optical scanner 1. In such cases, a similar effect to that mentioned above can be obtained.

Additionally, in FIG. 8, a configuration in which, after light synthesized by the dichroic mirrors 92A, 92B, and 92C is two-dimensionally scanned by the optical scanner 1, an image is formed on the screen S after reflecting the light by using a fixed mirror 93 is used, but the fixed mirror 93 may be omitted, and the screen S may be directly irradiated with the light two-dimensionally scanned by the optical scanner 1.

Hereinafter, application examples of image display devices will be described.

Application Example 1 of Image Display Device

Figure 9:
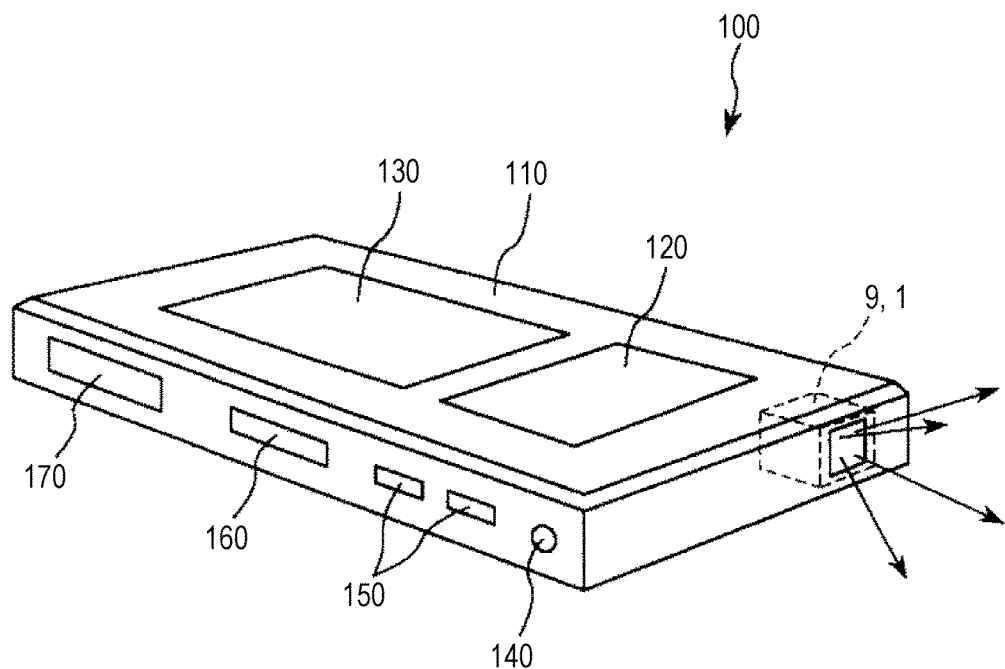
FIG. 9 is a perspective view that shows Application Example 1 (a portable image display device) of the image display device according to an embodiment of the invention.

FIG. 9 is a perspective view that shows Application Example 1 (a portable image display device) of the image display device of the invention.

As shown in FIG. 9, the image display device 9 can be applied to a portable image display device 100.

The portable image display device 100 has a casing 110 formed to dimensions that can be gripped by a hand, and the image display device 9, which is built into the casing 110. As a result of the portable image display device 100, for example, it is possible to display a predetermined image on a screen or a predetermined surface on a desk, or the like.

In addition, the portable image display device 100 has a display 120 that displays predetermined information, a keypad 130, an audio port 140, a control button 150, a card slot 160, and an AV port 170.

Additionally, the portable image display device 100 is provided with a telephone calling, and other functions such as a GPS reception function.

Application Example 2 of Image Display Device

Figure 10:
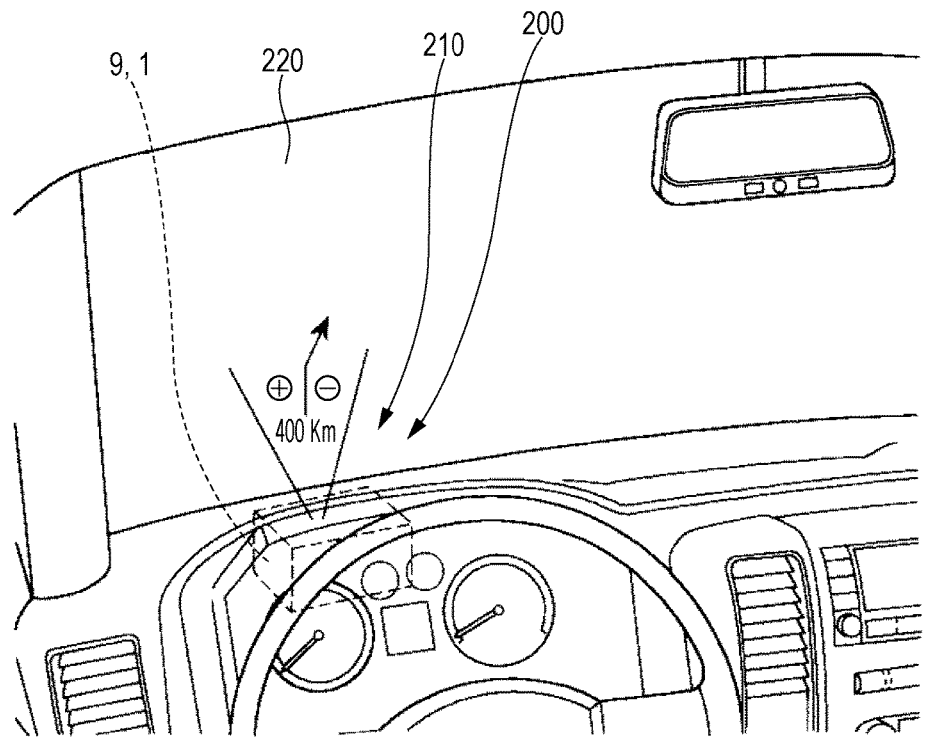
FIG. 10 is a perspective view that shows Application Example 2 (a heads-up display) of the image display device according to an embodiment of the invention.

FIG. 10 is a perspective view that shows Application Example 2 (a heads-up display) of the image display device of the invention.

As shown in FIG. 10, the image display device 9 can be applied to a heads-up display system 200.

In the heads-up display system 200, the image display device 9 is mounted on a dashboard of an automobile so as to configure a heads-up display 210. As a result of the heads-up display 210, for example, it is possible to display a predetermined image such as a guide display to a destination, for example, on a front glass 220.

Such a heads-up display 210 is provided with an optical scanner 1 such as that mentioned above. As a result of this, a heads-up display having excellent image quality is configured and the power consumption of the optical scanner 1 is reduced, and consequently, it is possible to reduce the power consumption of the heads-up display 210.

Additionally, the heads-up display system 200 is not limited to an automobile, and for example, can be applied to an aircraft, a ship, or the like.

Application Example 3 of Image Display Device

Figure 11:
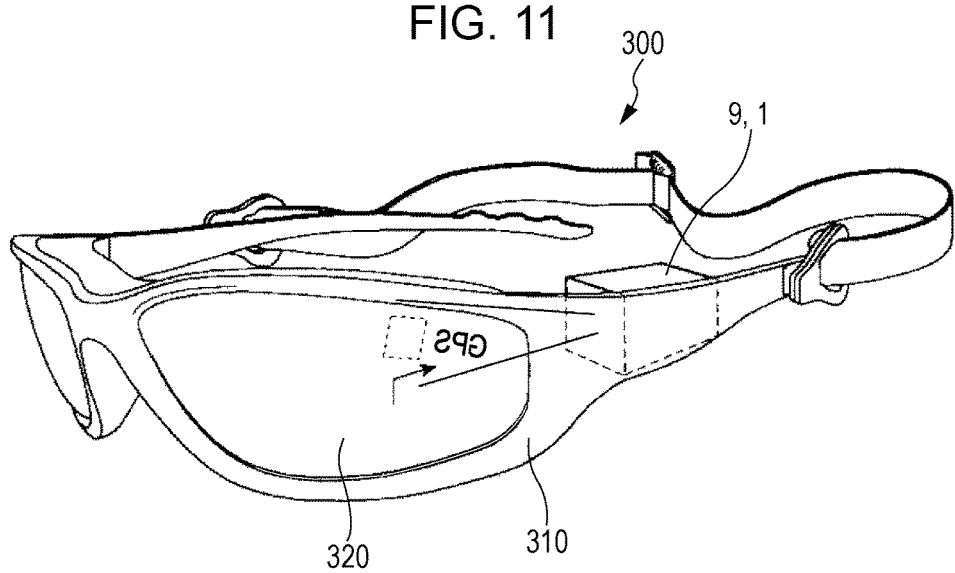
FIG. 11 is a perspective view that shows Application Example 3 (a head-mounted display) of the image display device according to an embodiment of the invention.

FIG. 11 is a perspective view that shows Application Example 3 (a head-mounted display) of the image display device of the invention.

As shown in FIG. 11, the image display device 9 can be applied to a head-mounted display 300.

That is, the head-mounted display 300 has eye glasses 310, and the image display device 9 mounted in the eye glasses 310. Further, as a result of the image display device 9, a predetermined image to be visually recognized by one eye is displayed on a display portion 320 provided in a location, which is ordinarily a lens, of the eye glasses 310.

The display portion 320 may be transparent, or may be opaque. In a case in which the display portion 320 is transparent, use by adding information from the image display device 9 to information from the real world is possible.

A head-mounted display 300 such as that mentioned above is provided with an optical scanner 1 such as that mentioned earlier. As a result of this, a head-mounted display having excellent image quality is configured and the power consumption of the optical scanner 1 is reduced, and consequently, it is possible to reduce the power consumption of the head-mounted display 300.

Additionally, two image display devices 9 may be provided in the head-mounted display 300, and an image to be visually recognized by both eyes may be displayed on two display portions.

An optical scanner, an image display device, a head-mounted display, and a heads-up display of the invention have been described above on the basis of illustrated embodiments, but the invention is not limited to these embodiments. For example, the configurations of each portion of the invention can be substituted with arbitrary configurations that have similar functions, and in addition, it is also possible to add arbitrary configurations.

In addition, in the above-mentioned embodiments, a configuration in which the drive portion has a permanent magnet and a coil, the permanent magnet is provided in the frame body portion, and the coil is provided so as to face the permanent magnet is described, but conversely, the coil may be provided in the frame body portion and the permanent magnet may be provided so as to face the coil.

The entire disclosure of Japanese Patent Application No. 2016-191963, filed Sep. 29, 2016 is expressly incorporated by reference herein.

What is claimed is:

1. An optical scanner comprising:
a movable portion having a light reflecting portion that reflects light;
a frame body portion;
a first axis portion that connects the movable portion and the frame body portion and oscillatably supports the movable portion around a first oscillation axis;
a support portion; and
a second axis portion that connects the frame body portion and the support portion and oscillatably supports the frame body portion around a second oscillation axis, which intersects the first oscillation axis;
wherein, in a planar view from a thickness direction of the movable portion, when a distance between an end portion of the movable portion in a direction following the second oscillation axis and the frame body portion is defined as L1, and a distance between an end portion of the frame body portion in a direction following the first oscillation axis and the support portion is defined as L3,
a relationship corresponding to 2<L1/L3<5 is satisfied, and
in the planar view, the inner peripheral edge of the support portion has a section that extends along an outer peripheral edge of the frame body portion.

2. The optical scanner according to claim 1,
wherein, in the planar view, when an inner peripheral edge of the support portion has a section that extends along a side surface of the second axis portion, and a distance between the section and the side surface of the second axis portion is defined as L2,
a relationship corresponding to L1>L2 is satisfied.

3. The optical scanner according to claim 1,
wherein, in the planar view, when an inner peripheral edge of the frame body portion has a section that extends along a side surface of the first axis portion and a distance between the section and the side surface of the first axis portion is defined as L4,
a relationship corresponding to L1>L4 is satisfied.

4. The optical scanner according to claim 1, further comprising:
a space formation member that is separated from the frame body portion, is disposed overlapping the frame body portion in a planar view, and forms a space with the frame body portion.

5. The optical scanner according to claim 4,
wherein the space formation member does not overlap with at least a portion of the movable portion in a planar view.

6. The optical scanner according to claim 1,
wherein the movable portion oscillates in resonance around the first oscillation axis, and
the frame body portion oscillates in non-resonance around the second oscillation axis.

7. An image display device comprising the optical scanner according to claim 1.

8. An image display device comprising the optical scanner according to claim 2.

9. An image display device comprising the optical scanner according to claim 3.

10. An image display device comprising the optical scanner according to claim 4.

11. An image display device comprising the optical scanner according to claim 5.

12. An image display device comprising the optical scanner according to claim 6.

13. A head-mounted display comprising the optical scanner according to claim 1.

14. A head-mounted display comprising the optical scanner according to claim 2.

15. A heads-up display comprising the optical scanner according to claim 1.

* * * * *